United States Patent [19]

Toyoda et al.

[11] Patent Number: 5,390,274
[45] Date of Patent: Feb. 14, 1995

[54] DISTRIBUTED GRADED INDEX TYPE OPTICAL TRANSMISSION PLASTIC ARTICLE AND METHOD OF MANUFACTURING SAME

[75] Inventors: Nobuhiko Toyoda; Yoshihiko Mishina; Ryuji Murata; Yoshihiro Uozu; Masaaki Oda; Teruta Ishimaru, all of Otake, Japan

[73] Assignee: Mitsubishi Rayon Company Ltd., Tokyo, Japan

[21] Appl. No.: 908,603

[22] Filed: Jul. 30, 1992

Related U.S. Application Data

[63] Continuation of Ser. No. 689,880, filed as PCT/JP89/00991, Sep. 29, 1989, published as WO91/05275, Apr. 18, 1991, abandoned.

[51] Int. Cl.$^6$ .............................................. G02B 6/18
[52] U.S. Cl. .................... 385/124; 359/654; 359/900; 385/120
[58] Field of Search ............ 385/115, 116, 120, 121, 385/123, 124; 359/652, 653, 654, 900

[56] References Cited

U.S. PATENT DOCUMENTS

| | | | |
|---|---|---|---|
| 4,331,380 | 5/1982 | Rees et al. | 385/116 |
| 4,435,039 | 3/1984 | Lama et al. | 385/116 |
| 4,568,146 | 2/1986 | Ueba et al. | |
| 4,589,736 | 5/1986 | Harrigan et al. | 385/124 X |
| 4,799,761 | 1/1989 | Yamamoto et al. | 385/124 |
| 5,175,786 | 12/1992 | Toyoda et al. | 385/124 |

FOREIGN PATENT DOCUMENTS

| | | |
|---|---|---|
| 0208159 | 1/1987 | European Pat. Off. |
| 0242636 | 10/1987 | European Pat. Off. |
| 62-209402 | 9/1987 | Japan .......................... G02B 6/18 |
| 62-215204 | 9/1987 | Japan .......................... G02B 6/00 |

OTHER PUBLICATIONS

Lama, William; Applied Optics, "Optical Properties of GRIN Fiber Lens Arrays: Dependence of Fiber Length", vol. 21, No. 15, pp. 2739–2746, Aug. 1982.

Primary Examiner—John D. Lee
Attorney, Agent, or Firm—Oblon, Spivak, McClelland, Maier, & Neustadt

[57] ABSTRACT

A distributed refractive index type optical transmission plastic article has a circular cross section of a radius $r_0$ which is in a range of 0.4 to 0.6 mm. A refractive index distribution of the optical transmission article substantially approximates a predetermined ideal refractive index distribution curve at least in a range of $0.25r_0$ to $0.70r_0$ extending from a center axis toward a peripheral surface of the article. A refractive index $n_0$ at a central part of the article is in a range of 1.4 to 1.6. The article has a refractive index distribution constant of larger than 0.15 mm$^{-1}$ and smaller than 0.3 mm$^{-1}$, and a modulation transfer function of at least 55%. This optical transmission article is made from uncured liquid substances each having a viscosity of between $10^3$ and $10^8$ poises. N (N≧2) uncured liquid substances having refractive indexes n of $n_1 > n_2 > n_3 \ldots n_N$ when cured are arranged in such a way that the refractive indexes n are successively reduced from a central portion toward a peripheral portion, and concentrically laminated one upon the other to form an uncured strand fiber. The substances between adjacent layers of the fiber are mutually diffused. During the diffusion or thereafter, the uncured strand fiber is cured, thereby completing the production of the optical transmission article.

4 Claims, 6 Drawing Sheets

DISTRIBUTED GRADED INDEX TYPE OPTICAL TRANSMISSION PLASTIC ARTICLE AND METHOD OF MANUFACTURING SAME

This application is a continuation of application Ser. No. 07/689,880, filed as PCT/JP89/00991, Sep. 29, 1989, published as WO91/05275, Apr. 18, 1991, now abandoned.

TECHNICAL FIELD

The present invention relates to an optical transmission article and a method of manufacturing same, which is useful for optical transmission lines such as near parabolic optical fibers, rod-like convergent lenses, and photosensors, as well as for an image transmitting array employed in a copying machine using a white light source.

BACKGROUND ART

Optical transmission articles each with refractive indexes gradually distributed from the center toward the periphery on a cross-section thereof are disclosed in Japanese Examined Patent Publication No. 47-816, Japanese Examined Patent Publication No. 47-28059, and European Patent Publication No. 0208159.

The distributed refractive index type optical transmission article disclosed in Japanese Examined Patent Publication No. 47-816 is made of glass and fabricated by an ion exchange method. This method, however, has a poor productivity and cannot produce articles having an identical shape (an identical length, in particular) and an identical performance. Even with an identical performance, the fabricated distributed refractive index type optical transmission articles have different lengths, and thus problems arise with the handling thereof.

The distributed refractive index type optical transmission plastic article disclosed in Japanese Examined Patent Publication No. 47-28059 is made by mixing two or more transparent polymers having different refractive indexes and different solubilities with respect to a particular solvent. The mixed polymers are shaped into a rod or a fiber, and immersed in the solvent to extract a part of the polymers from the surface thereof, thereby changing a mixing ratio of the polymers from the surface toward the center thereof. Since the optical transmission article of this method is made of a mixture of two or more polymers having different refractive indexes, fluctuations in the refractive indexes of the article occur, deteriorating the transparency and causing light scattering, and therefore, the article cannot serve as the distributed refractive index type optical transmission article. Accordingly, little improvement can be expected in the application and development of this method.

European Patent Publication No. 0208159 describes a method in which (A) at least one kind of thermoplastic polymer and (B) a monomer which is compatible with the polymer (A) when polymerized and forms a polymer having a refractive index different from that of the polymer (A), are mixed and formed into a rod-like shape. From the surface of the shaped body, the monomer (B) is volatilized to continuously distribute the monomer (B) from the surface toward the interior of the formed material, and thereafter, the non-polymerized monomer in the shaped body is polymerized to form a distributed refractive index type optical transmission plastic article.

An ideal refractive index distribution curve of the distributed refractive index type optical transmission article is expressed as follows:

$$N = N_0(1 - ar^2)$$

Figure 2:
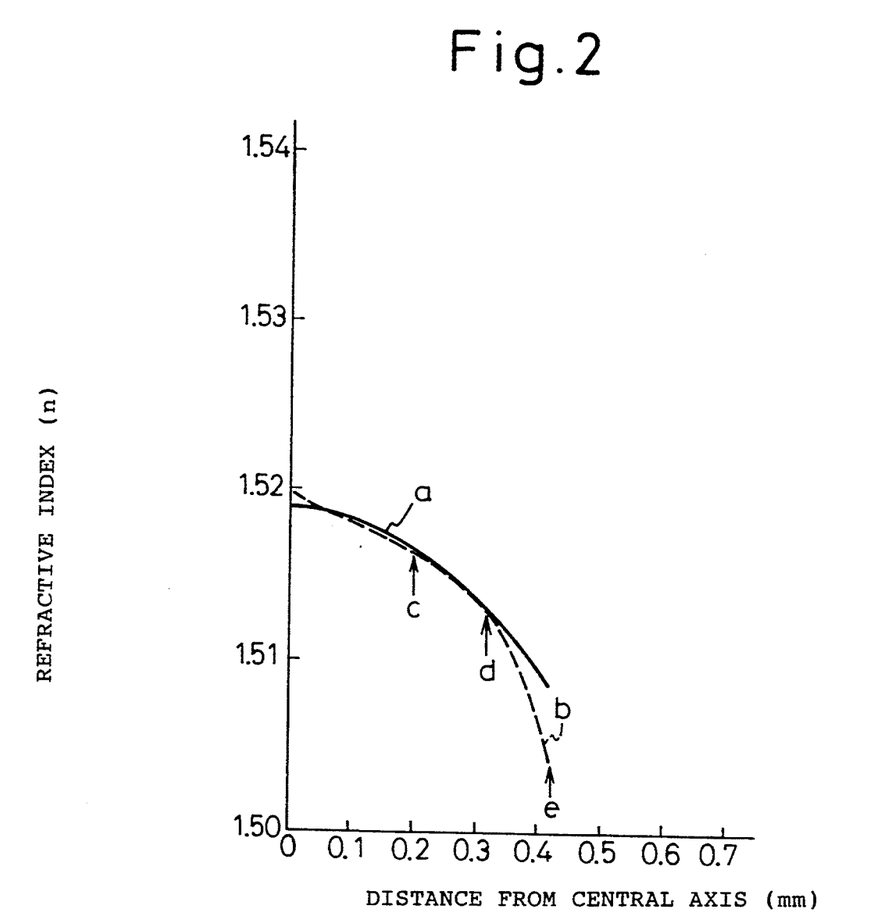
FIG. 2 shows a refractive index distribution curve of a distributed refractive index type optical transmission plastic article formed according to a prior art method.

This curve is considered to be the same as a curve "a" of FIG. 2.

According to studies and measurements made by the inventor, using an Interfaco interference microscope under conditions to be explained later, however, the distributed refractive index type optical transmission article fabricated according to the above-mentioned method provides a refractive index distribution curve "b" of FIG. 2. In a range of $0.5r_0$ to $0.75r_0$ of radial distances from the center (i.e., in a range of c to d in the figure, with e being an outermost part), the curve b is relatively close to the ideal curve expressed by the equation (1). At the outer and inner sides of the above range, however, the refractive index distribution is greatly deviated from the ideal curve.

Figure 3A:
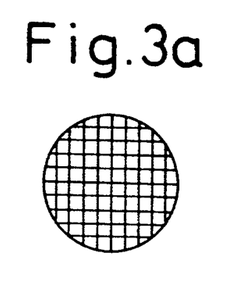
FIGS. 3a-3c are views of examples of grid images obtained by these optical transmission articles.
Figure 3B:
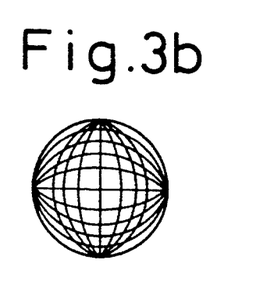
Figure 3C:
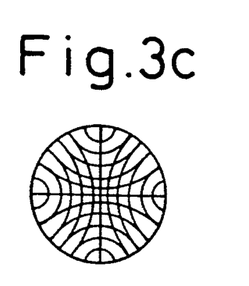

When a grid pattern is observed through these optical transmission articles, if the optical transmission article has a refractive index pattern which almost correctly follows the quadratic curve defined by the equation (1), the article will provide a normal grid image as shown in FIG. 3(a). If, however, the refractive index distribution of the optical transmission article deviates from the ideal refractive index distribution, as indicated by (b) of FIG. 2, the article will provide a distorted grid image as shown in FIGS. 3(b) and 3(c), since the article can not transmit a correct image. In this case, a moderation transfer factor (MTF) indicating the resolution of the article is very low, i.e., less than 30%, which is not acceptable for use as an optical transmission article of a copying machine.

Accordingly, the conventional distributed refractive index type optical transmission article with the refractive index distribution as shown by (b) of FIG. 2 must be cut or eluted by a solvent process to remove a portion outer than the position (d) of FIG. 2, thereby providing the optical transmission article with an optical path having a relatively ideal refractive index distribution. It is, however, difficult to provide an optical transmission article with a high resolution, and thus the productivity thereof is very low, and it is very difficult to constantly produce products having a uniform quality.

DISCLOSURE OF THE INVENTION

An object of the invention is to provide a distributed refractive index type optical transmission plastic article which can be applied to a copying machine employing a white light source. Compared with the conventional optical transmission articles, the optical transmission article of the invention has a higher resolution, is brighter, and obtains a remarkably improved productivity.

The invention provides a distributed refractive index type optical transmission plastic article having a circular cross section of a radius $r_0$ and a refractive index distribution which substantially approximates a refractive index distribution curve defined by the following equation (1), at least in a range of $0.25r_0$ to $0.70r_0$ extending from a center axis toward a peripheral surface of the optical transmission article:

$$n(r) = n_0\{1 - (g^2/2)r^2\} \tag{1}$$

where $n_0$ is a refractive index at the center axis of the optical transmission article;

$n(r)$ is a refractive index at a position of a radius r away from the center axis of the optical transmission article;

g is a refractive index distribution constant ($mm^{-1}$) of the optical transmission article; and r is a distance (mm) from the center axis toward the peripheral surface of the optical transmission article, wherein, $1.4 \leq n_0 \leq 1.6$
$0.4 \leq r_0 \ (mm) \leq 0.6$
$0.15 \leq g \ (mm^{-1}) < 0.3$ said distributed refractive index type optical transmission plastic article having a modulation transfer function (hereinafter referred to as the MTF) of not less than 55%, calculated according to the following equation (2):

$$MTF = \{(i_{max} - i_{min})/(i_{max} + i_{min})\} \times 100 \quad (2)$$

when a grid image of 4 line-pairs/mm is formed through the optical transmission article on a CCD line sensor and a maximum value $i_{max}$ and a minimum value $i_{min}$ of light quantities of the image are measured.

The invention also provides a method of manufacturing the distributed refractive index type optical transmission plastic article. This method employs N (N≧2) uncured liquid substances each having a viscosity of between $10^3$ and $10^8$ poises and refractive indexes n of $n_1 > n_2 > n_3 \ldots n_N$ when cured, concentrically laminates the substances in such a way that the refractive indexes are successively reduced from the center toward the periphery of the laminated substances to form an uncured strand fiber, mutually diffuses the substances between adjacent layers in such a way that the refractive indexes are continuously distributed between the layers, and at the same time or thereafter, cures the uncured strand fiber.

BEST MODE OF CARRYING OUT THE INVENTION

Figure 1:
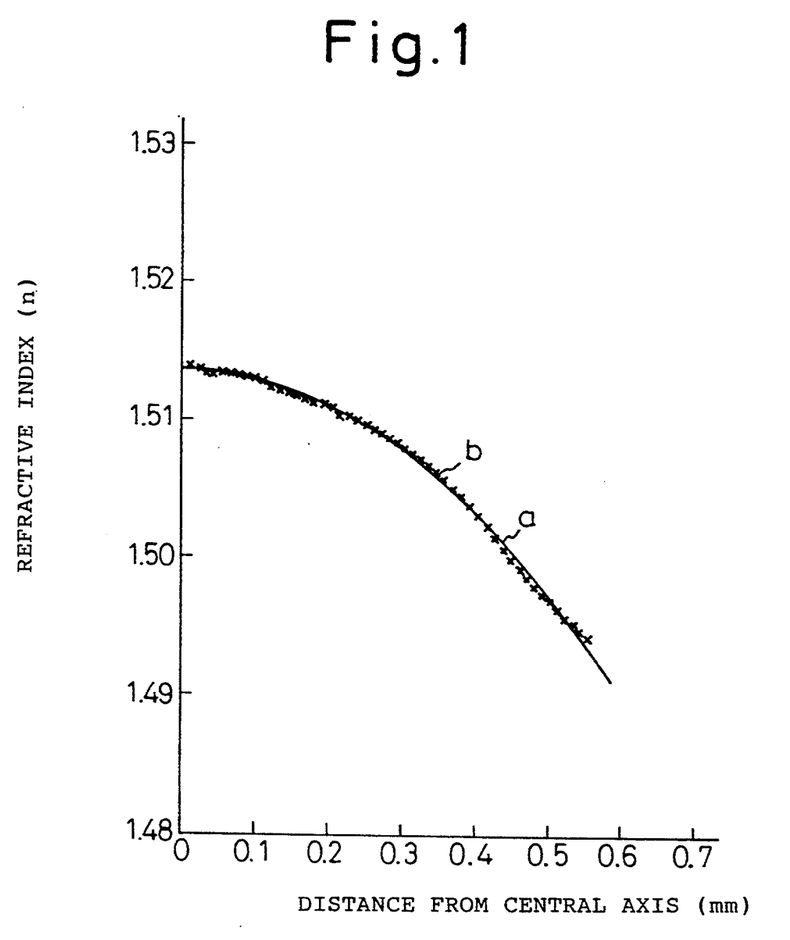
FIG. 1 shows a refractive index distribution curve of an example of distributed refractive index type optical transmission articles of the invention.

As indicated by (b) of FIG. 1, a refractive index distribution curve of the optical transmission article of the invention must substantially approximate the ideal refractive index distribution curve ((a) of FIG. 1) expressed with the equation (1), at least in a range of $0.25r_0$ to $0.70r_0$, preferably $0.20r_0$ to $0.75r_0$, from a center axis. If a distributed refractive index type optical transmission plastic article has a refractive index distribution curve which does not approximate the refractive index distribution curve (a) of FIG. 1 expressed with the equation (1), in a range of $0.25r_0$ to $0.75r_0$ from a center axis, the optical transmission article cannot correctly transfer images or satisfy the requirements for an optical transmission article applied to a copying machine, and therefore, can not be applied for such a purpose.

The distributed refractive index type optical transmission plastic article of the invention must have a value $n_0$ of $1.4 \leq n_0 \leq 1.6$. If the value exceeds 1.6, the optical transmission plastic article is difficult to produce, and if the value $n_0$ is smaller than 1.4, a difference of refractive indexes at the center axis and at the periphery of the article cannot be enlarged, to thus realize an optical transmission article having an excellent resolution and image transmitting characteristics.

A value g is defined by the following equation (3):

$$g = \sqrt{2(N_0 - N_r)/(N \times r^2)} \quad (3)$$

which defines a lens length and an image forming length. When the value g is greater than 0.3 $mm^{-1}$, the optical transmission article may have a chromatic aberration, and therefore, may not be appropriate for an optical transmission article used with a white light source. When the value g is smaller than 0.15 $mm^{-1}$, the optical transmission article may have a long image forming length and be difficult to handle.

When the distributed diffraction index type optical transmission plastic article of the invention is used for a copying machine, etc., a plurality of such articles, instead of a single article, are usually arranged in a single row or a plurality of rows in a zigzag manner, to form an array of the optical transmission materials in which images provided by the articles partly overlap each other to form an image. The visibility of the overlapped images depends on the degree of overlapping, which is influenced by the diameter of each optical transmission article. To obtain a clear image, the radius $r_0$ must be in a range of 0.4 to 0.6 mm. If the article is thinner than this, the article may have an insufficient brightness and difficult to produce with a uniform refractive index distribution. If the article is thicker than the above range, the images provided by the array of the optical transmission articles may unevenly overlap each other, and thus will not transmit clear images.

Figure 4:
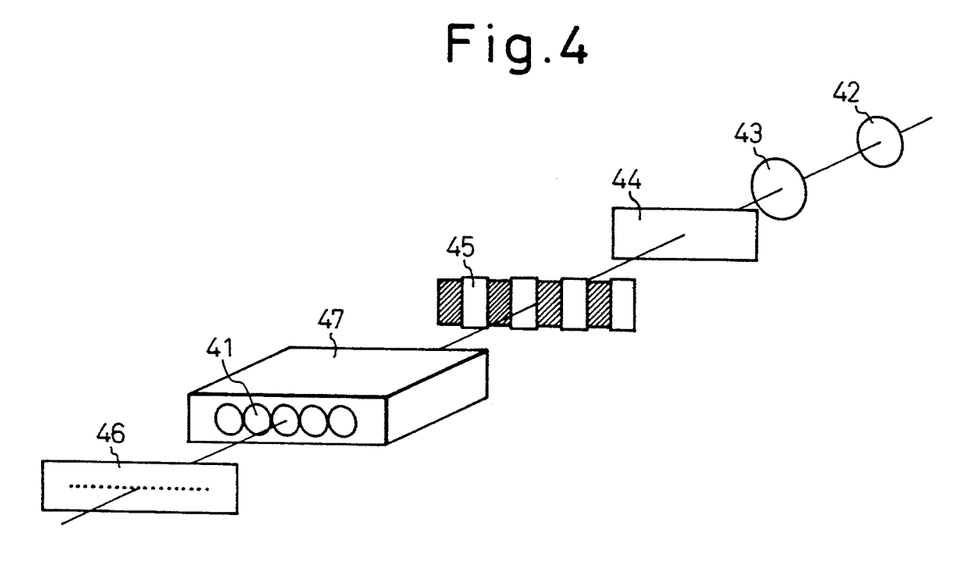
FIG. 4 is a schematic view of an apparatus for measuring the resolution of an optical transmission article.
Figure 5:
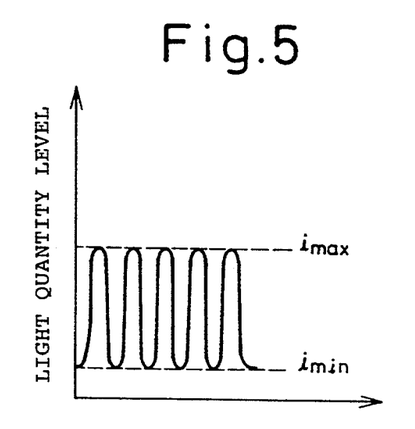
FIG. 5 is a graph showing the light quantity levels of a grid image measured with a CCD sensor.

The MTF, which indicates resolution of the distributed refractive index optical transmission plastic article of the invention, can be determined as follows. Namely, as shown in FIG. 4, a light source 42, a filter 43, a diffusion plate 44, a grid 45, and an array 47 composed of a plurality of distributed refractive index type optical transmission articles 41 form a resolution measuring apparatus. A grid image having a spatial frequency of 4 (line-pairs/mm) is passed through the optical transmission articles 41 to form an image on a CCD line sensor 46. The formed grid image is read, and a maximum value ($i_{max}$) and a minimum value ($i_{min}$) of light quantities of the image are measured as shown in FIG. 5. According to the measured $i_{max}$ and $i_{min}$, the MTF is calculated from the following equation (2):

$$MTF(\%) = \{(i_{max} - i_{min})/(i_{max} + i_{min})\} \times 100 \quad (2)$$

where the grid constant is the number of lines per millimeter (line-pairs/mm), in which each line comprises a pair of white and black lines as shown on the grid 45 of FIG. 4.

The MTF of the distributed refractive index type optical transmission plastic article of the invention must be not less than 55%. If the MTF is smaller than 55%, the optical transmission article provides a low resolution and cannot form a clear image when applied to a copying machine such as a facsimile.

The distributed refractive index type optical transmission plastic article of the invention may be fabricated in the following manner:

N ($N \geq 2$) uncured liquid substances each having a viscosity of between $10^3$ and $10^8$ poises in an uncured state and refractive indexes n of $n_1 > n_2 > n_3 \ldots n_N$ in a cured state are prepared, and these uncured liquid substances are concentrically laminated, one upon the other, in such a way that the refractive indexes are successively reduced from the center toward the periphery of the laminated substances, thereby forming an uncured strand fiber. The substances of the strand fiber are then mutually diffused between adjacent layers to provide a continuous refractive index distribution between the layers, during which or thereafter the uncured strand fiber is cured.

If $N \geq 2$ is established in the distributed refractive index type optical transmission article having the value g of $0.3 > g \geq 0.15$, a required difference $n_1 - n_N$ may be set between a center layer and an outermost layer of the optical transmission material, and accordingly, it will become easy to fabricate the optical transmission article of the invention having a refractive index distribution which approximates the curve of the equation (1), in a range of $0.25r_0$ to $0.75r_0$ from the center of the article. Accordingly, N must be 2 or greater than 2, preferably 2 to 7, and more preferably 3 to 5.

When carrying out the invention, each of the uncured liquid substances must have a viscosity of between $10^3$ and $10^8$ poises and be curable. If the viscosity is smaller than $10^3$ poises, the strand will be easily broken and it will be difficult to form a strand-like shape. If the viscosity is greater than $10^8$ poises, the substance will have a poor shaping processability which will lead to a deterioration of the concentricity or the forming of irregular diameters.

The liquid substances to be employed when carrying out the invention may be radical polymerizable vinyl monomers, or compositions comprising the monomers and polymers that are soluble with the monomers.

The radical polymerizable vinyl monomers are, for example, methyl methacrylate ($n=1.49$), styrene ($n=1.59$), chlorostyrene ($n=1.61$), vinyl acetate ($n=1.47$), fluorized alkyl(meta)acrylate ($n=1.37$ to 1.44) such as 2,2,3,3-tetrafluoropropyl(meta)acrylate, 2,2,3,3,4,4,5,5-octafluoropropyl(meta)acrylate, 2,2,3,4,4,4-hexafluoropropyl(meta)acrylate, and 2,2,2-trifluoroethyl(meta)acrylate, and (meta)acrylates having a refractive index between 1.43 and 1.62 such as ethyl(meta)acrylate, phenyl(meta)acrylate, benzyl(meta)acrylate, hydroxylalkyl(meta)acrylate, alkyleneglycoldi(meta)acrylate, trimethylolpropane-di or -tri(-meta)acrylate, pentaerythritol-di, -tri, or -tetra(meta)acrylate, diglycerintetra(meta)acrylate, dipentaerythritolhexa(meta)acrylate, as well as diethyleneglycolbisallylcarbonate, fluorized alkyleneglycolpoly(meta)acrylate, etc.

In order to adjust the viscosities of these cured liquid substances and make the distribution of the refractive index of an obtained strand fiber from the center toward the outside of the strand fiber, the uncured liquid substances are preferably composed of vinyl-based monomers and soluble polymers. The polymers able to be used must have a good compatibility with polymers produced from the radical polymerizable vinyl monomers. These polymers are, for example, poly(methyl methacrylate) ($n=1.49$), poly(methyl methacrylate)-based copolymers ($n=1.47$ to 1.50), poly-4-methylpenten-1 ($n=1.46$), ethylene/vinyl acetate copolymers ($n=1.46$ to 1.50), polycarbonate ($n=1.50$ to 1.57), poly(vinylidene fluoride) ($n=1.42$), vinylidene fluoride/tetrafluoroethylene copolymers ($n=1.42$ to 1.46), vinylidene fluoride/tetrafluoroethylene/hexafluoropropene copolymers ($n=1.40$ to 1.46), and poly(alkyl fluoride)(meta)acrylate polymers.

To adjust the viscosities, it is preferable to use polymers having an identical refractive index for respective layers, because an optical transmission plastic article having refractive indexes continuously distributed from the center toward the surface of the material can thus be formed. In particular, poly(methyl methacrylate) has an excellent transparency and a high refractive index, and therefore, is preferably used for producing the distributed refractive index type optical transmission article of the invention.

To cure the strand fiber formed from the uncured substances, it is preferable to add a thermosetting catalyst and/or photocatalyst to the uncured substances. The fiber strand containing the thermosetting catalyst and/or photocatalyst is heated or irradiated with light, preferably ultraviolet light.

The thermosetting catalyst may be a peroxide-based catalyst, and the photopolymerization catalyst may be benzophenone, benzoinalkylether, 4'-isopropyl-2-hydroxy-2-methyl-propiophenone, 1-hydroxycyclohexylphenylketone, benzylmethylketal, 2,2-diethoxyacetophenone, chlorothioxanthone, thioxanthone-based compounds, benzophenone-based compounds, 4-dimethylaminobenzoic ethyl, 4-dimethylaminobenzoic isoamyl, N-methyldiethanolamine, triethylamine, etc.

The light source used for the photopolymerization may be a carbon arc lamp, a high-pressure mercury lamp, an ultra-high pressure mercury lamp, a low-pressure mercury lamp, a chemical lamp, a xenon lamp, or a laser beam, etc., emitting light having a wavelength of 150 to 600 nm.

Figure 6:
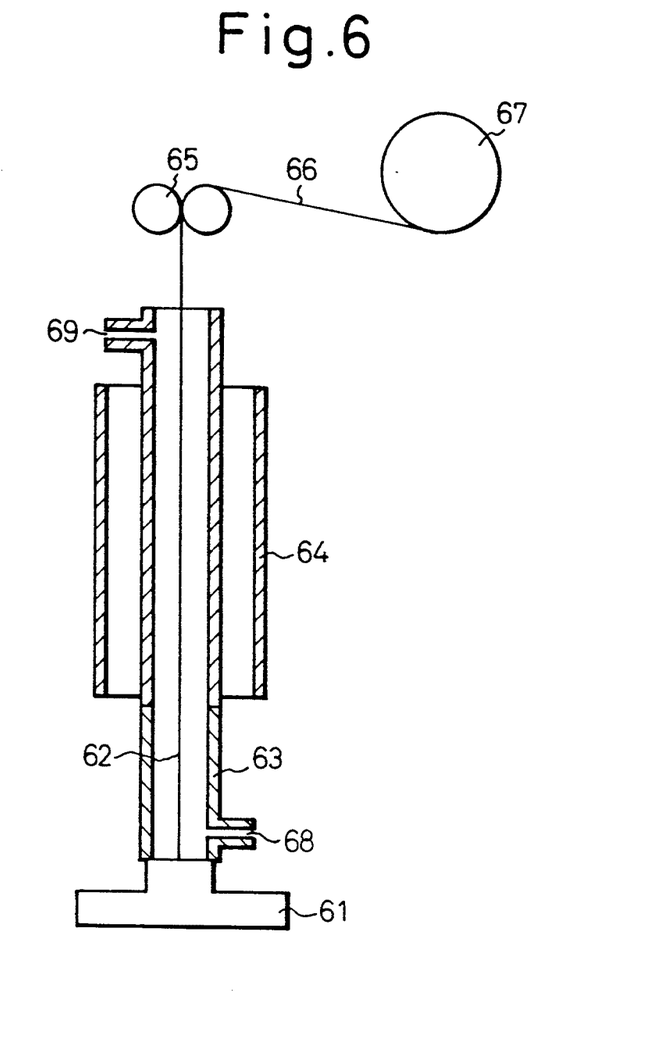
FIG. 6 is a schematic view of an apparatus preferably used for forming the distributed refractive index type optical transmission plastic article of the invention.

To produce the optical transmission article of the invention, a strand fiber forming apparatus shown in FIG. 6, for example, may be used. A concentric composite nozzle 61 extrudes an uncured strand fiber 62, which is passed through a mutual diffusion portion 63 for mutually diffusing monomers of respective layers of the strand fiber to impart a refractive index distribution, as well as through a curing portion 64 for curing the uncured substances. The strand fiber is then passed between pulling rollers 65, and wound, as a distributed refractive index type optical transmission plastic article 66, around a winding portion 67. To remove volatilizing substances released from the strand fiber 62, from the mutual diffusion portion 63 and from the curing portion 64, an inert gas such as a nitrogen gas is introduced from an inert gas introducing port 68, and discharged from a discharging port 69.

The distributed refractive index type optical transmission article obtained according to the above method may have a coating layer with a low refractive index. The coating layer can be formed by mixing trifluoroalkylacrylate, pentafluoroalkylacrylate, hexafluoroalkylacrylate, fluoroalkylenediacrylate, 1,1,2,2-tetrahydroheptadecafluorodecylacrylate, hexanedioldiacrylate, neopentylglycoldiacrylate, dipentaerythritolhexaacrylate, etc. As and when required, polymers of fluorized acrylate or methacrylate may be added to adjust the applicability and refractive indexes. In addition, it is preferable to add photopolymerization initiators, The invention will be explained in more detail with reference to Examples.

The lens capacities and refractive index distributions of the examples were measured as follows:

I. MEASUREMENT OF LENS CAPACITIES

Evaluation Apparatus

Figure 7:
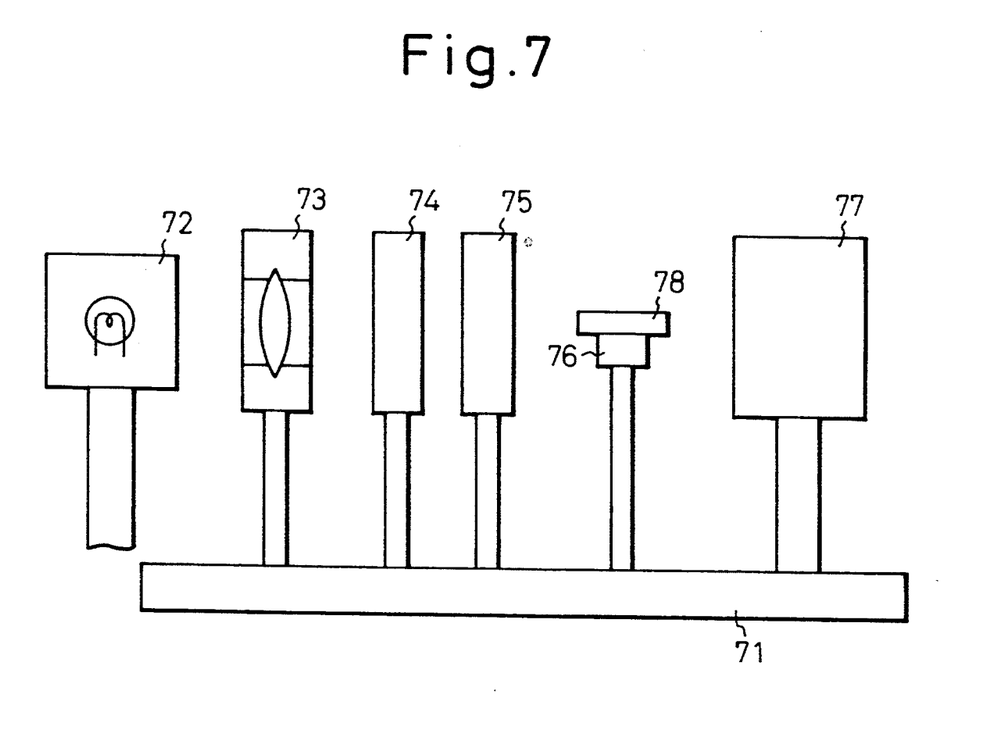
FIG. 7 is a schematic view of a lens capacity measuring apparatus.

The lens capacities were measured with an evaluation apparatus shown in FIG. 7.

Preparation of Samples

Each optical transmission article prepared according to the Examples was cut to a length of about one fourth ($\lambda/4$) of a period ($\lambda$) of a light beam. The period ($\lambda$) was determined from the wave form of a He-Ne laser beam passing through the article. The article was then polished with a polisher, to make both end faces of the sample parallel to each other and orthogonal to a longitudinal axis, and thus a sample to be evaluated was obtained.

Measuring Method

As shown in FIG. 7, a sample table (76) was placed on an optical bench (71), and a sample (78) to be evaluated was placed on the sample table (76). A diaphragm (74) was adjusted so that light from a light source (72) passes through a condenser lens (73), the diaphragm (74), and a glass plate (75) and entirely irradiates an end face of the sample. Thereafter, the sample (78) and a Polaroid camera (77) were adjusted so that the light was focused on a film in a Polaroid (a trademark of the Polaroid company) camera. An image of a square grid was photographed, and a distortion of the grid was observed. The glass plate (75) was a chrome-plated photomasking glass, the chrome film on which was precisely processed to form a square grid pattern of 0.1 mm.

II. MEASUREMENT OF REFRACTIVE INDEX DISTRIBUTION

An Interfaco interference microscope made by the Carl Zeiss company was used for this measurement.

EXAMPLE 1

Poly(methyl methacrylate) ([$\rho$]=0.34 measured in methylethylketone (MEK) at 25° C.) of 52 parts by weight, benzylmethacrylate of 35 parts by weight, methylmethacrylate of 13 parts by weight, 1-hydroxycyclohexylphenylketone of 0.2 parts by weight, and hydroquinone of 0.1 parts by weight were heated and mixed at 60° C. to form an uncured substance as an original liquid for forming a first layer (a central portion). Poly(methyl methacrylate) ([$\rho$]=0.34 measured in MEK at 25° C.) of 50 parts by weight, benzylmethacrylate of 15 parts by weight, methylmethacrylate of 35 parts by weight, 1-hydroxycyclohexylphenylketone of 0.2 parts by weight, and hydroquinone of 0.1 parts by weight were heated and mixed at 60° C. to form an uncured substance as an original liquid for forming a second layer. Poly(methyl methacrylate) ([$\rho$]=0.34 measured in MEK at 25° C.) of 50 parts by weight, methylmethacrylate of 50 parts by weight, 1-hydroxycyclohexylphenylketone of 0.2 parts by weight, and hydroquinone of 0.1 parts by weight were heated and mixed to form an uncured substance as an original liquid for forming a third layer (outer layer portion). The three kinds of the original liquids were simultaneously extruded from a composite nozzle to form a concentric strand fiber. During this extrusion, the viscosity of the first layer components was $4.7 \times 10^4$ poises, that of the second layer components was $3.7 \times 10^4$ poises, and that of the third layer components was $2.9 \times 10^4$ poises. The temperature of the composite nozzle was 60° C. As shown in FIG. 6, the strand fiber 62 extruded from the nozzle was passed through the mutual diffusion portion (63) 45 cm in length, to mutually diffuse the monomers between layers of the strand fiber. Thereafter, the strand fiber was passed through the center of a light irradiating portion composed of 12 fluorescent lamps (120 cm long, output 40 W) equidistantly arranged in a ring shape, at a speed of 40 cm/min, and as a result, the monomers in the strand fiber were polymerized to form a distributed refractive index type optical transmission plastic article which was then drawn by nip rollers.

Figure 8:
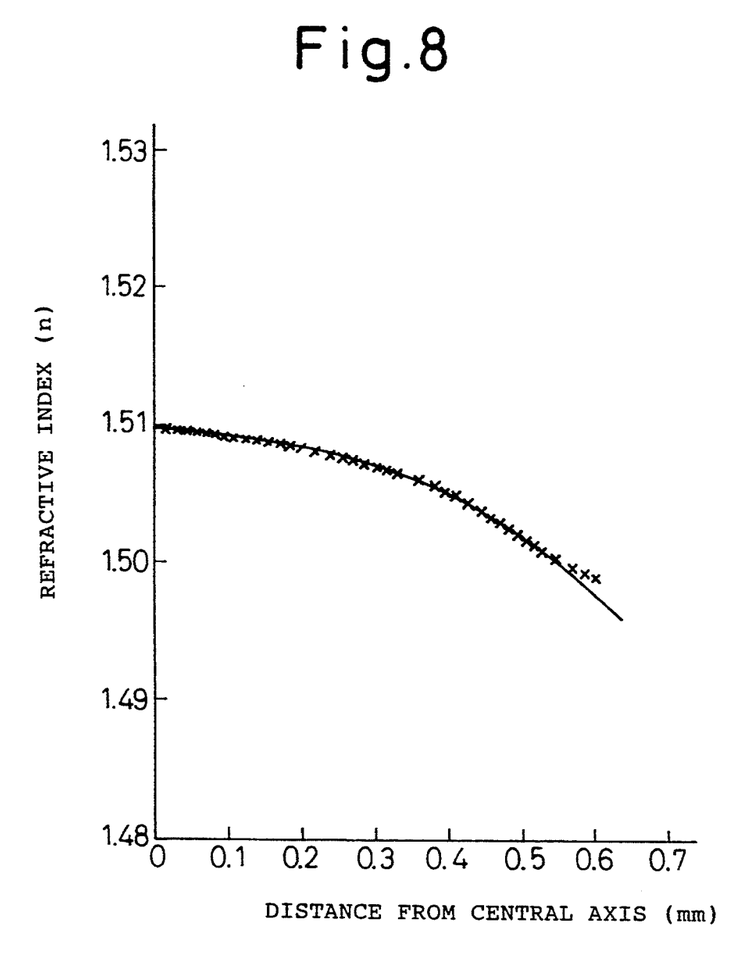
FIG. 8 shows a refractive index distribution curve of an example of distributed refractive index type optical transmission plastic optical articles of the invention.

When forming the strand fiber, a ratio f discharged quantities of the first, second, and third layers was 7:4:1. The distributed refractive index type optical transmission article thus produced had a radius ($r_0$) of 0.59 mm, distributed refractive indexes measured by the Interfaco interference microscope of 0.508 at a central portion and 1.498 at a peripheral portion, and a refractive index distribution constant (g) of 0.20 mm$^{-1}$. As shown in FIG. 8, a refractive index distribution of the article substantially approximated the equation (1), in a range of $0.15r_0$ to $0.75r_0$ extending from the center toward the external face of the article. Both end surfaces of the optical transmission article were polished to a lens length of 18.4 mm, and an MTF thereof was measured with a grid of 4 line-pairs/mm; the MTF was 60% at a conjugate length of 42.4 mm. The obtained grid image was clear with only a minor distortion.

A plurality of the optical transmission articles were employed to form an optical transmission article array having a lens length of 18.4 mm as indicated by the numeral 47 in FIG. 4, an MTF thereof was measured with a grid of 4 line-pairs/mm, and it was found that the MTF was 52%. At this time, a conjugate length of a rod-like lens forming the optical transmission article array was 42.4 mm. This optical transmission article array, an LED light source, and a light receiving CCD element were assembled into an image scanner, which provided a high resolution and was able to transmit clear images.

EXAMPLE 2

The three kinds of original liquids used in the Example 1 and a fourth layer forming original liquid made of poly(methyl methacrylate) ([$\rho$]=0.34 measured in MEK at 25° C.) of 47 parts by weight, methylmethacrylate of 40 parts by weight, 2,2,3,3,4,4,5,5-octafluoropentylmethacrylate of 13 parts by weight, 1-hydroxycyclohexylphenylketone of 0.2 parts by weight, and hydroquinone of 0.1 part by weight were heated and mixed at 60° C. to form uncured substances, and thereafter, the four kinds of original liquids were simultaneously extruded from a concentric four-layer composite spinning nozzle to form a concentric strand fiber. During this extrusion, the viscosities of the first, second, and third layers were substantially the same as those of the Example 1, and the viscosity of the fourth layer-forming components was $2.5 \times 10^4$ poises. The temperature of the composite nozzle was 60° C.

Thereafter, the same processes as in Example 1 were carried out to provide a distributed refractive index type optical transmission plastic article.

When forming the strand fiber, a ratio of discharged quantities of the first, second, third, and fourth layers was 7:4:1:0.5. The optical transmission article thus produced had a radius ($r_0$) of 0.60 mm, distributed refractive indexes measured by the Interfaco interference microscope of 1.507 at a central portion and 1.496 at a peripheral portion, and a refractive index distribution constant (g) of 0.20 mm$^{-1}$. A refractive index distribution of the article substantially approximated the equation (1), in a range of $0.15r_0$ to $0.80r_0$ extending from the center toward the external face of the article. Both end surfaces of the optical transmission article were polished to a lens length of 18.4 mm, the MTF thereof was measured with a grid of 4 line-pairs/mm, and it was found that the MTF was 65% at a conjugate length of 42.4 mm. A plurality of the optical transmission articles were employed to form an optical transmission article array having a lens length of 18.4 mm, in a manner similar to the Example 1. An MTF of the array, measured with a grid of 4 line-pairs/mm, was 58% at a conjugate length of 42.4 mm. This optical transmission article array, an LED light source, and a light receiving CCD element were assembled into an image scanner, which provided a high resolution and was able to transmit clear images.

EXAMPLE 3

The four kinds of original liquids used in the Example 2 were used as original liquids for forming first to fourth layers. Poly(methyl methacrylate)($[\rho]=0.34$ measured in MEK at 25° C.) of 40 parts by weight, methylmethacrylate of 18 parts by weight, 2,2,3,3,4,4,6,6-octafluoropentylmethacrylate of 42 parts by weight, 1-hydroxycyclohexylphenylketone of 0.2 parts by weight, and hydroquinone of 0.1 part by weight were heated and mixed at 60° C. to form a fifth layer, and thereafter, the five kinds of original liquids were simultaneously extruded from a composite nozzle to form a concentric strand fiber. During this extrusion, the viscosities of the first, second, third, and fourth layers were substantially the same as those of Example 2, and the viscosity of the fifth layer-forming components was $2.2 \times 10^4$ poises. The temperature of the composite nozzle was 60° C.

Thereafter, the same processes as in Example 1 were carried out to provide a distributed refractive index type optical transmission plastic article. When forming the strand fiber, a ratio of discharged quantities of the first, second, third, fourth, and fifth layers was 7:4:1:0.6:0.4. The optical transmission article thus produced had a radius ($r_0$) of 0.60 mm, distributed refractive indexes measured by the Interfaco interference microscope of 1.507 at a central portion and 1.494 at a peripheral portion, and a refractive index distribution constant (g) of 0.20 mm$^{-1}$. A refractive index distribution of the article substantially approximated the equation (1), in a range of $0.15r_0$ to $0.85r_0$ extending from the center toward the external surface of the article. Both end surfaces of the optical transmission article were polished to a lens length of 17.8 mm, the MTF thereof was measured with a grid of 4 line-pairs/mm, and it was found that the MTF was 72% at a conjugate length of 32.6 mm. A plurality of the optical transmission articles were formed into an optical transmission article array having a lens length of 17.8 mm, in a manner similar to Example 1. An MTF of the array measured with the grid of 4 line-pairs/mm was 65% at a conjugate length of 32.6 mm. This optical transmission article array, an LED light source, and a light receiving CCD element were assembled into an image scanner, which provided a high resolution and was able to transmit clear images.

COMPARATIVE EXAMPLE 1

The same four kinds of original liquids as those used in the Example 2 were employed at a ratio of discharged quantities of the first, second, third, and fourth layers of 1:1:1:1. The other conditions were the same as those of Example 2 in forming a strand fiber. The monomers were diffused, and the curing process was carried out to prepare an optical transmission article having a radius ($r_0$) of 0.55 mm, distributed refractive indexes measured by the Interfaco interference microscope of 1.506 at a central portion and 1.486 at a peripheral portion, and a refractive index distribution constant (g) of 0.29 mm$^{-1}$. The refractive index distribution of the article agreed with the equation (1) for only about 10% of the radial range. Both end surfaces of the optical transmission article were polished to a lens length of 13.5 mm, and the MTF of the article measured with a grid of 4 line-pairs/mm, was 22% at a conjugate length of 24.7 mm. A plurality of the optical transmission articles were assembled into an optical transmission article array having a lens length of 13.5 mm in a similar manner to Example 1. An MTF of the array measured with the grid of 4 line-pairs/mm was 19% at a conjugate length of 24.7 mm. This optical transmission article array, an LED light source, and a light receiving CCD element were assembled into an image scanner, which provided a very poor resolution.

EXAMPLE 4

Poly(methyl methacrylate) ($[\rho]=0.34$ measured in MEK at 25° C.) of 51 parts by weight, benzylmethacrylate of 20 parts by weight, methylmethacrylate of 29 parts by weight, 1-hydroxycyclohexylphenylketone of 0.2 parts by weight, and hydroquinone of 0.1 part by weight were heated and mixed at 60° C. to form an uncured substance as an original liquid for forming a first layer. The original liquid for forming the third layer used in the Example 1 was used as an original liquid for forming a second layer. The original liquid for forming the fourth layer used in the Example 2 was used as an original liquid for forming a third layer. These three kinds of original liquids were used to prepare a distributed refractive index type optical transmission material in a manner similar to the Example 1. At this time, the viscosity of the first layer-forming components was $4.5 \times 10^4$ poises.

When forming a strand fiber, a ratio of discharged quantities of the first, second, and third layers was 7:3:1. The prepared optical transmission article had a radius ($r_0$) of 0.46 mm, distributed refractive indexes measured by the Interfaco interference microscope of 1.500 at a central portion and 1.490 at a peripheral portion, and a refractive index distribution constant (g) of 0.25 mm$^{-1}$. A refractive index distribution of the article substantially approximated the equation (1) in a range of $0.15r_0$ to $0.81r_0$ extending from the center toward the external face of the article. Both end surfaces of the optical transmission article were polished to a lens length of 15.6 mm, the MTF thereof was measured with a grid of 4 line-pairs/mm, and it was found that the MTF was 62% at a conjugate length of 29.0 mm. A plurality of the optical transmission articles were employed to form an optical transmission article array having a lens length of 15.6 mm in a manner similar to Example 1. An MTF of the array measured with the grid of 4 line-pairs/mm was 55% at a conjugate length of 29.0 mm. This optical transmission article array, an LED light source, and a light receiving CCD element were assembled into an image scanner, which provided a high resolution and was able to transmit clear images.

EXAMPLE 5

A polymer [A] ($n_0$=1.456, [ρ]=1.00 measured in MEK at 25° C.) of 50 parts by weight composed of methylmethacrylate of 50% by weight and 2,2,3,3-tetrafluoropropylmethacrylate of 50% by weight, methylmethacrylate of 50 parts by weight, 1-hydroxycyclohexylphenylketone of 0.2 part by weight, and hydroquinone of 0.1 part by weight were heated and mixed at 60° C. to form an uncured substance as an original liquid for forming a first layer. The above polymer [A] of 48 parts by weight, 2,2,3,3-tetrafluoropropylmethacrylate of 22 parts by weight, methylmethacrylate of 30 parts by weight, 1-hydroxycyclohexylphenylketone of 0.2 part by weight, and hydroquinone of 0.1 part by weight were heated and mixed at 60° C. to form an uncured substance as an original liquid for forming a second layer. The polymer [A] of 46 parts by weight, 2,2,3,3-tetrafluoropropylmethacrylate of 44 parts by weight, methylmethacrylate of 10 parts by weight, 1-hydroxycyclohexylphenylketone of 0.2 part by weight, and hydroquinone of 0.1 part by weight were heated and mixed at 60° C. to form an uncured substance as an original liquid for forming a third layer. The three kinds of original liquids were spun to form a composite in a manner similar to Example 1 at the viscosities of $4.0 \times 10^4$ poises for the first layer-forming components, $3.3 \times 10^4$ poises for the second layer-forming components, and $3.1 \times 10^4$ poises for the third layer-forming components.

When forming the strand fiber, a ratio of discharged quantities of the first, second, and third layers was 7:4:1. The prepared optical transmission article had a radius ($r_0$) of 0.50 mm, distributed refractive indexes measured by the Interfaco interference microscope of 1.472 at a central portion and 1.459 at a peripheral portion, and a refractive index distribution constant (g) of 0.27 mm$^{-1}$. A refractive index distribution of the article substantially approximated the equation (1), in a range of $0.15r_0$ to $0.78r_0$ extending from the center toward the external face of the article. Both end surfaces of the optical transmission article were polished to a lens length of 14.0 mm, the MTF thereof was measured with a grid of 4 line-pairs/mm, and it was found that the MTF was 64% at a conjugate length of 29.0 mm. A plurality of the optical transmission articles were employed to form an optical transmission article array having a lens length of 14.0 mm in a manner similar to Example 1. An MTF of the array measured with the grid of 4 line-pairs/mm was 57% at a conjugate length of 29 mm. This optical transmission article array, an LED light source, and a light receiving CCD element were assembled into an image scanner, which provided a high resolution and was able to transmit clear images.

INDUSTRIAL APPLICABILITY

Compared with an optical transmission article of a prior art of the same kind, the distributed refractive index type optical transmission plastic article of the invention substantially approximates the ideal distribution curve of the equation (1), at least in a range of $0.25r_0$ to $0.75r_0$ from the center of the article, and therefore, without a cutting of the peripheral portion thereof, the article of the invention provides excellent lens characteristics. The distribution refractive index type optical transmission article of the invention, therefore, can be applied to an image transmitting array of a copying machine employing a white light source, and to an optical transmission line such as a near parabolic optical fiber, a rod-like convergent lens, and an optical sensor.

The optical transmission article of the invention can be efficiently manufactured by a multilayer extrusion method of concentrically extruding more than three layers from uncured substances.

We claim:

1. A distributed refractive index type optical transmission plastic article having a circular cross section of a radius $r_0$ and a refractive index distribution which substantially approximates a refractive index distribution curve defined by the following equation (1) at least in a range of $0.25r_0$ to $0.70r_0$ extending from a center axis toward a peripheral surface of the optical transmission article:

$$n(r) = n_0\{1 - (g^2/2)r^2\} \quad (1)$$

where $n_0$ is a refractive index at the center axis of the optical transmission article;

n(r) is a refractive index at a position of radius r away from the center axis of the optical transmission article;

g is a refractive index distribution constant (mm$^{-1}$) of the optical transmission article;

r is a distance (mm) from the center axis toward the peripheral surface of the optical transmission article; and $1.4 \leq n_0 \leq 1.6$ $0.4 \leq r_0 \text{ (mm)} \leq 0.6$ $0.15 \leq g \text{ (mm}^{-1}) < 0.3$ wherein when a grid image of 4 line-pairs/mm is formed through the optical transmission article on a CCD line sensor and a maximum value $i_{max}$ and a minimum value $i_{min}$ of light quantities of the image are measured, a modulation transfer function (MTF) calculated according to the following equation (2):

$$MTF = \{(i_{max} - i_{min})/(i_{max} + i_{min})\} \times 100 \quad (2)$$

is at least 55%.

2. A distributed refractive index type optical transmission plastic article as set forth in claim 1, wherein the refractive index distribution of the optical transmission article substantially approximates the refractive index distribution curve defined by the equation (1) at least in a range of $0.20r_0$ to $0.75r_0$ extending from the center axis toward the peripheral surface of the optical transmission article.

3. A method of manufacturing a distributed refractive index type optical transmission plastic article comprising the steps of preparing N (N≧2) uncured liquid substances having a viscosity between $10^3$ and $10^8$ poises each and refractive indexes n of $n_1 > n_2 > n_3 \ldots n_N$ when cured, concentrically laminating the substances in such a way that the refractive indexes are successively reduced from the center toward the periphery of the laminated substances to form an uncured strand fiber, mutually diffusing the substances between adjacent layers in such a way that the refractive indexes are continuously distributed between the layers, and thereafter, curing the uncured strand fiber.

4. An optical transmission article array comprising an assembly of a plurality of distributed refractive index type plastic optical transmission articles arranged in a single line or a plurality of lines, said distributed refractive index type optical transmission plastic articles each having a circular cross section of a radius $r_0$ and a refractive index distribution which substantially approximates a refractive index distribution curve defined by the following equation (1) at least in a range of $0.25r_0$ to $0.70r_0$ extending from a center axis toward a peripheral surface of the optical transmission article:

$$n(r) = n_0\{1 - (g^2/2)r^2\} \tag{1}$$

where $n_0$ is a refractive index at the center axis of the optical transmission article;

n(r) is a refractive index at a position of radius r away from the center axis of the optical transmission article;

g is a refractive index distribution constant (mm$^{-1}$) of the optical transmission article;

r is a distance (mm) from the center axis toward the peripheral face of the optical transmission article; and $1.4 \leq n_0 \leq 1.6$ $0.4 \leq r_0 \text{ (mm)} \leq 0.6$ $0.15 \leq g \text{ (mm}^{-1}) < 0.3$ wherein when a grid image of 4 line-pairs/mm is formed through the optical transmission article on a CCD line sensor and a maximum value $i_{max}$ and a minimum value $i_{min}$ of light quantities of the image are measured, a modulation transfer function (MTF) calculated according to the following equation (2):

$$MTF(\%) = \{(i_{max} - i_{min})/(i_{max} + i_{min})\} \times 100 \tag{2}$$

is at least 55%.

* * * * *

UNITED STATES PATENT AND TRADEMARK OFFICE
CERTIFICATE OF CORRECTION

PATENT NO. : 5,390,274
DATED : February 14, 1995
INVENTOR(S) : Nobuhiko TOYODA, et al.

It is certified that error appears in the above-indentified patent and that said Letters Patent is hereby corrected as shown below:

On the title page, Item [22], the application date should read --Jun. 30, 1992--

Signed and Sealed this

Sixteenth Day of May, 1995

Attest:

BRUCE LEHMAN

Attesting Officer

Commissioner of Patents and Trademarks